US010174176B2

(12) United States Patent
Guan

(10) Patent No.: US 10,174,176 B2
(45) Date of Patent: Jan. 8, 2019

(54) CHITIN NANOWHISKER COMPOSITES AND METHODS

(71) Applicant: BOCO Technology Inc., Toronto (CA)

(72) Inventor: Qi Guan, Toronto (CA)

(73) Assignee: Boco Technology Inc., Toronto, Ontario (CA)

( * ) Notice: Subject to any disclaimer, the term of this patent is extended or adjusted under 35 U.S.C. 154(b) by 312 days.

(21) Appl. No.: 15/243,051

(22) Filed: Aug. 22, 2016

(65) Prior Publication Data

US 2017/0183459 A1 Jun. 29, 2017

Related U.S. Application Data

(62) Division of application No. 14/725,425, filed on May 29, 2015, now Pat. No. 9,453,121, which is a division of application No. 13/935,621, filed on Jul. 5, 2013, now Pat. No. 9,169,376.

(51) Int. Cl.
| | |
|---|---|
| *C08L 55/02* | (2006.01) |
| *C08K 7/02* | (2006.01) |
| *C08J 5/00* | (2006.01) |
| *C08L 5/08* | (2006.01) |
| *C08L 69/00* | (2006.01) |
| *C08J 5/04* | (2006.01) |

(52) U.S. Cl.
CPC .............. *C08J 5/005* (2013.01); *C08J 5/045* (2013.01); *C08L 5/08* (2013.01); *C08L 55/02* (2013.01); *C08L 69/00* (2013.01); *C08J 2323/06* (2013.01); *C08J 2323/12* (2013.01); *C08J 2355/02* (2013.01); *C08J 2369/00* (2013.01); *C08J 2405/08* (2013.01); *C08K 7/02* (2013.01)

(58) Field of Classification Search
CPC .................................. C08L 55/02; C08K 7/02
See application file for complete search history.

(56) References Cited

U.S. PATENT DOCUMENTS

2009/0203642 A1 8/2009 Morganti et al.

FOREIGN PATENT DOCUMENTS

CN 102383213 3/2012

OTHER PUBLICATIONS

Morin, A. et al., Nanocomposites of Chitin Whiskers from Riftia Tubes and Poly(caprolactone), Macromolecules, 2002, 35, 2190-2199.
Paillet, C. et al, Communications to the Editor, Macromolecules(2001) 34, 19, 6527-6530.
Araki, J. et al, Chitin-chitosan nanocomposite gels: reinforcement of chitosan hydrogels with rod-like chitin nanowhiskers, Polymer Journal 2012, 44, 713-717.
Nair, K.G. et al, Crab Shell Chitin Whisker Reinforced Natural Rubber Nanocomposites. 1. Processing and Swelling Behavior, Biomacromolecules 2003, 4, 657-665.
Mathew, A. et al, Cross-Linked Chitosan/Chitin Crystal Nanocomposites with Improved Permeation Selectivity and pH Stability, Biomacromolecules 2009, 10, 1627-1632.
Lin, N. et al, Effect of polysaccharide nanocrystals on structure, properties, and drug release kinetics of alginate-based microspheres, Colloids and Surfaces B: Biointerfaces 2011, 85 270-279.
Watthanaphanit, A et al, Fabrication, Structure, and Properties of Chitin Whisker-Reinforced Alginate Nanocomposite Fibers, Journal of Applied Polymer Science 2008, 110, 890-899.
Fan, Y. et al, Individual chitin nano-whiskers prepared from partially deacetylated a-chitin by fibril surface cationization,Carbohydrate Polymers 2010, 79, 1046-1051.
Lertwattamaser, T. et al, Microwave technique for efficient deacetylation of chitin nanowhiskers to a chitosan nanoscaffold, Carbohydrate Research 2009, 344, 331-335.
Lu, Y. et al, Morphology and Properties of Soy Protein Isolate Thermoplastics Reinforced with Chitin Whiskers, Biomacromolecules 2004, 5, 1046-1051.
Uddin, A. et al, Outstanding reinforcing effect of highly oriented chitin whiskers in PVA nanocomposites, Carbohydrate Polymers 2012, 87, 799-805.
Sriupayo, J. et al, Preparation and characterization of a-chitin whisker-reinforced poly(vinyl alcohol) nanocomposite films with or without heat treatment, Polymer 2005, 46, 5637-5644.
Wongpanit, P. et al, Preparation and characterization of chitin whisker-reinforced silk fibroin nanocomposite sponges, European Polymer Journal 2007, 43, 4123-4135.
Hariraksapitak, P. et al, Preparation and Properties of a-Chitin-Whisker-Reinforced Hyaluronan-Gelatin Nanocomposite Scaffolds, Journal of Applied Polymer Science 2010, 117, 3406-3418.
Rizvi, R. et al, Fabrication and characterization of melt-blended polylactide-chitin composites and their foams, Journal of Cellular Plastics 2011, 47(3), 283-300.
Feng, L. et al, Structure and Properties of New Thermoforming Bionanocomposites Based on Chitin Whisker-Graft-Polycaprolactone, Journal of Applied Polymer Science 2009,112, 2830-2837.
Junkasem, J. et al, X-ray diffraction and dynamic mechanical analyses of α-chitin whisker-reinforced poly(vinyl alcohol) nanocomposite nanofibers, Polym Int 2010, 59, 85-91.
Yamamoto, Y. et al, CaCO3/chitin-whisker hybrids: formation of CaCO3 crystals in chitin-based liquid-crystalline suspension, Polymer Journal 2010, 42, 583-586.

(Continued)

*Primary Examiner* — Wenwen Cai
(74) *Attorney, Agent, or Firm* — Matthew Powell; Gilbert's LLP

(57) ABSTRACT

A composite is provided that is formed by melt-blending particles of thermoplastic polymer that have been coated with a chitin nanowhisker gel, wherein the thermoplastic polymer comprises acrylonitrile butadiene styrene. A composite comprising chitin nanowhiskers dispersed in acrylonitrile butadiene styrene is also provided.

8 Claims, 10 Drawing Sheets

(56) References Cited

OTHER PUBLICATIONS

Zeng, J. et al, Chitin Whiskers: An Overview, Biomacromolecules 2012, 13, 1-11.

Li, X. et al, Cooperative performance of chitin whisker and rectorite fillers on chitosan films, Carbohydrate Polymers 2011, 85, 747-752.

Nair, K. et al, Crab Shell Chitin Whisker Reinforced Natural Rubber Nanocomposites. 2. Mechanical Behavior, Biomacromolecules 2003, 4, 666-674.

Phongying, S. et al, Direct chitosan nanoscaffold formation via chitin whiskers, Polymer 2007, 48, 393-400.

Junkasem, J. et al, Fabrication of α-chitin whisker-reinforced poly-(vinyl alcohol) nanocomposite nanofibres by electrospinning, Nanotechnology 2006, 17, 4519-4528.

Uddin, A. et al, Interfacial interaction and mechanical properties of chitin whisker-poly(vinyl alcohol) gel-spun nanocomposite fibers, Polym Int 2012, 61, 1010-1015.

Mincea, M. et al, Preparation, Modification, and Applications of Chitin Nanowhiskers: A Review, Rev.Adv.Mater. Sci. 2012, 30, 225-242.

Dufresne, A., Polysaccharide nanocrystal reinforced nanocomposites1, Can. J. Chem. 2008, 86, 484-494.

Sriupayo, J. et al, Preparation and characterization of a-chitin whisker-reinforced chitosan nanocomposite films with or without heat treatment, Carbohydrate Polymers 2005, 62, 130-136.

Zeng, M. et al, Preparation and Characterization of Nanocomposite Films from Chitin Whisker and Waterborne Poly(esterurethane) With or Without Ultra-Sonification Treatment, Journal of Macromolecular Science, Part A: Pure and Applied Chemistry 2010, 47, 867-876.

Visakh, P. et al, Preparation of Bionanomaterials and their Polymer Nanocomposites from Waste and Biomass, Waste Biomass Valor 2010, 1, 121-134.

Kadakawa, J. et al, Preparation of chitin nanowhiskers using an ionic liquid and their composite materials with poly(vinyl alcohol), Carbohydrate Polymers, 2011, 84,1408-1412.

Zhang, X. et al, Structure and properties of polysaccharide nanocrystal-doped supramolecular hydrogels based on Cyclodextrin inclusion, Polymer 2010, 51, 4398-4407.

Watthanaphanit, A. et al, Wet-spun alginate/chitosan whiskers nanocomposite fibers: Preparation, characterization and release characteristic of the whiskers, Carbohydrate Polymers, 2010,79, 738-746.

PCT International Search Report dated Sep. 16, 2014 for PCT/CA2014/000532.

Nel et al, "Investigation of the effect of chitin nano whiskers on the structural and physical properties of high impact polypropylene/chitin composites", Polychar 22 World Forum on Advanced Materials, Apr. 7-11, 2014.

Mato et al., "Plastic Resin Pellets as a Transport Medium for Toxic Chemicals in the Marine Environment", Environ. Sci. Technol. 2001, 35, 318-324.

CHITIN NANOWHISKER COMPOSITES AND METHODS

CROSS-REFERENCE TO RELATED APPLICATION

This application is filed under 35 U.S.C. 121 as a divisional of U.S. patent application Ser. No. 14/725,425 filed on May 29, 2015, which is a divisional of U.S. patent application Ser. No. 13/935,621 filed on Jul. 5, 2013, the contents of which are incorporated herein by reference.

FIELD OF THE INVENTION

The following relates generally to nanocomposites and more particularly to chitin nanowhisker composites, methods of fabricating chitin nanowhisker composites, and methods of processing chitin.

BACKGROUND OF THE INVENTION

Nanoparticles are particles having one or more dimensions between 1 and 100 nanometers (nm). Due primarily to a high percentage of their atoms being positioned at the surface providing a very large surface area for their size, nanoparticles of a given material can exhibit markedly different properties and behaviours than larger particles of the same material.

Nanocomposites are multiple-phase materials, found in nature or fabricated, where one of the phases is nanoparticles. For example, a solid nanocomposite comprises nanoparticles dispersed in a bulk solid matrix. Due to the unique physical properties of nanoparticles, a small percentage of nanoparticles can have noticeable, macro-scale effects on the bulk solid matrix. As such, fabrication of nanocomposites having nanoparticles for imparting beneficial macro-scale mechanical, electrical, optical, dielectric, thermal, antimicrobial or other effects is of great interest.

Nanofibrils, or nanowhiskers, are nanoparticles having a crystalline rod-like structure. Chitin nanowhiskers include crystalline polysaccharides having a diameter of about 10 nm and a length of about 200 nm to about 500 nm that may be found in an abundant, biodegradable and non-toxic structural polysaccharide, material found in crustaceans such as shrimp and crab, known as chitin. Chitin nanowhiskers are desirable for nanocomposites due to their ability to impart desirable mechanical and antimicrobial effects, as well as due to their biodegradability, their abundance and their non-toxicity.

In nature, chitin contains both amorphous and crystalline chitin along with various other components such as proteins and the like. For forming nanocomposites, it is desirable to extract mostly individual chitin nanowhiskers from chitin so that the individual nanowhiskers can be dispersed throughout a bulk matrix. As such, it is desirable to process the chitin to generally extract only individual chitin nanowhiskers, without also extracting agglomerated chitin nanowhiskers that can be undesirably larger in size, amorphous chitin, and the proteins or other materials.

When forming the nanocomposites on an industrial scale using chain nanowhiskers, it can be challenging to ensure that nanoparticles are generally uniformly dispersed in the bulk solid matrix. Unless the chitin nanowhiskers are dispersed in this way, an overall body of nanocomposite material will not exhibit the desirable properties uniformly. Too low a concentration of chitin nanowhiskers will have little beneficial effect, while too high a concentration of chitin nanowhiskers can undesirably weaken the material locally. Furthermore, if the overall body of nanocomposite material is to be subdivided into pellets or other smaller units prior to provision to a downstream process, there can be a wide variation in amounts of chitin nanowhiskers across individual pellets.

SUMMARY OF THE INVENTION

According to an aspect, there is provided a composite formed by melt-blending particles of thermoplastic polymer that have been coated with a chitin nanowhisker gel, wherein the thermoplastic polymer comprises acrylonitrile butadiene styrene.

According to another aspect, there is provided a composite comprising chitin nanowhiskers dispersed in acrylonitrile butadiene styrene.

Other aspects may become apparent to the ordinary skilled reader upon review of the following.

DESCRIPTION OF THE DRAWINGS

Embodiments of the invention will now be described with reference to the appended drawings in which.

DETAILED DESCRIPTION

Figure 1:
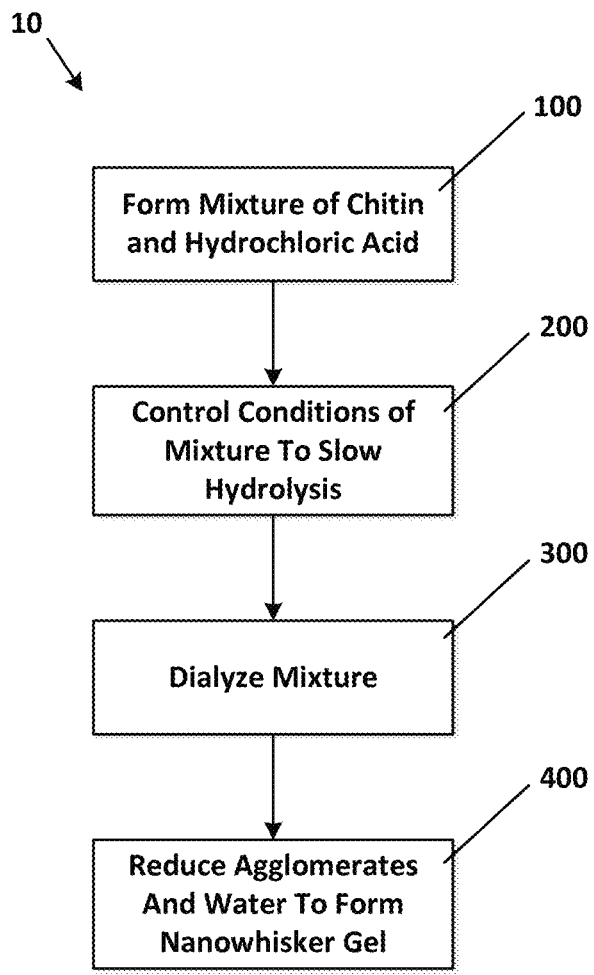
FIG. 1 is a flowchart showing steps in a method for processing chitin.

Turning to FIG. 1, there is shown a flowchart with steps in a method 10 for processing chitin to yield a chitin nanowhisker gel. An initially non-colloidal mixture substantially of chitin and hydrochloric acid is first formed, to subject the chitin to hydrolysis (step 100). In this embodiment, the chitin introduced into the process is in powder form, hydrolysis is conducted between about 80° C. (176° F.) and about 100° C. (212° F.), and the HCl is between about 2.5N and about 4N. The hydrolysis may be conducted at higher temperatures, but at lower than the bottom end of this range hydrolysis tends not to be effective.

While both crystalline and amorphous forms of the chitin are chemically the same, they are structurally different enough that the amorphous chitin is more reactive and therefore dissolves faster during acid hydrolysis than does the crystalline chitin. This distinction enables the crystalline form of chitin to withstand dissolution somewhat longer during acid hydrolysis than the amorphous chitin. After a time, which will depend on a number of factors including volumes but may be between about 1 hour and about 4 hours, the mixture will become substantially colloidal with the crystalline chitin dispersed and the amorphous chitin having been dissolved. When the mixture reaches this substantially colloidal state, conditions of the mixture are controlled to rapidly slow or stop the hydrolysis (step 200). This intervention is for limiting the extent to which the crystalline chitin is itself dissolved, so as to preserve crystalline chitin.

In this embodiment, controlling the conditions of the substantially colloidal mixture include both adding an amount of a base such as sodium hydroxide (NaOH) to bring the HCl to below 2.5N, and applying a chill to the substantially colloidal mixture. Preferably, in order for the process to be carried out safely on an industrial scale, the amount of sodium hydroxide added to the substantially colloidal mixture is less than would be required to cause a violent reaction with the hydrochloric acid. However, lower amounts of sodium hydroxide will limit the rate at which hydrolysis can be slowed or stopped. As such, applying the chill to bring the temperature down rapidly to a temperature at which hydrolysis is significantly slowed or stopped, for example to below 25° C. (77° F.), along with the adding of the base acts in combination to rapidly slow or stop the hydrolysis. Alternatively, just chilling, chilling and diluting with water, or chilling, neutralizing and diluting with water can be done. It will be understood that larger containers will be required if diluting with water, which may be undesirable when implementing the process on an industrial-scale.

With the conditions of the mixture having been controlled to rapidly slow or stop the hydrolysis, the substantially colloidal mixture is then dialysed to produce a processed colloidal mixture consisting substantially of water and crystalline chitin (step 300). The dialysis serves to remove constituents of the mixture other than the water and the crystalline chitin. Advantageously, adding sodium hydroxide to slow or stop hydrolysis in the controlling step also puts the mixture in a condition to increase the rate of dialysis itself, when compared to dialysis with just the hydrochloric acid. In particular, with the addition of sodium hydroxide (NaOH) to the hydrochloric acid (HCl), water and ions of sodium and chlorine ($Na^+$ and $Cl^-$, respectively), are produced. As such, the osmotic pressure during hydrolysis that is acting individually on each of the $Na^+$ and $Cl^-$ ions and the residual HCl is, in aggregate, greater than the osmotic pressure that would act independently on individual particles of HCl were the base not added. This increase in the rate of dialysis has the potential to increase the speed at which the process can be executed, which carries advantages when implementing on an industrial scale. In alternative embodiments, with the addition of a different base, different by-products would result. However, the osmotic pressure advantage would remain. Examples of bases include potassium hydroxide, barium hydroxide, cesium hydroxide, sodium hydroxide, strontium hydroxide, calcium hydroxide, lithium hydroxide, and rubidium hydroxide. Other bases may be used, and selection of a base may involve consideration of factors such as the toxicity of the by-products and the ease with which they may be disposed.

In this embodiment, dialysis is conducted using a cellulose semi-permeable membrane having pores that permit egress of HCl, $Na^+$ and $Cl^-$ without permitting egress of the chitin nanowhiskers in the mixture. As is well known, in order to avoid damaging a cellulose membrane, the temperature of the mixture to be dialyzed should be lower than the about 80° C. to about 100° C. temperature at which the hydrolysis is conducted. As such, chilling during the controlling step serves dual purposes of helping to stop or slow the hydrolysis as well as putting the mixture into a condition for dialysis with the cellulose membrane. The time for dialysis generally depends on the osmotic pressure, so flushing of the opposite side of the membrane may be done on a regular basis based on pH measurements, in an effort to preserve high osmotic pressure over the time dialysis is to be conducted. In an alternative embodiment, osmotic pressure may be increased by applying physical pressure to the mixture to force particles through the membrane. Other semi-permeable membranes may be employed for dialysis that either do not require cooling, or that require more or less cooling than a cellulose semi-permeable membrane.

Pursuant to the dialysis, crystalline chitin will remain that is likely to include agglomerated chitin nanowhiskers as well as individual chitin nanowhiskers. Because large agglomerations of chitin nanowhiskers generally do not impart the beneficial effects for nanocomposites that are imparted by individual chitin nanowhiskers or very small agglomerations of chitin nanowhiskers, it is desirable to separate the individual chitin nanowhiskers and very small agglomerations of chitin nanowhiskers from the large agglomerations of nanowhiskers. As such, following step 300, the amount of agglomerated chitin nanowhiskers in the processed colloidal mixture is reduced, as is the amount of water, in order to yield the chitin nanowhisker gel (step 400).

In this embodiment, during reducing the amount of agglomerated chitin nanowhiskers, the processed colloidal mixture resulting from dialysis is subjected to centrifuging. Since the agglomerated chitin nanowhiskers desired to be removed from the processed colloidal mixture are many times heavier than the individual chitin nanowhiskers that are to remain, the time and speed of centrifuging are controlled to move the agglomerated chitin nanowhiskers out of the main body of the processed colloidal mixture for disposal, without also moving very much individual chitin nanowhiskers. Low RPM is preferred for subjecting the individual chitin nanowhiskers to less force, but there is a trade off with the time it takes to move the agglomerated chitin nanowhiskers from the processing colloidal mixture. Once this centrifuging is conducted, the higher-viscosity layer containing the agglomerated chitin nanowhiskers is separated off and disposed of or routed elsewhere for further processing.

During reducing the amount of water, the processed colloidal mixture with agglomerated chitin nanowhiskers having been removed is subjected to additional centrifuging under different conditions. The goal of this additional centrifuging is to concentrate the chitin nanowhiskers into a high-viscosity layer to produce a chitin nanowhisker gel and to separate off the lower-viscosity layer (substantially water) that contains no or very few chitin nanowhiskers for disposal or routing elsewhere for further processing. In this embodiment, the centrifuging yields a chitin nanowhisker gel that is about 20% chitin nanowhiskers and 80% water, by weight. Control is exercised to ensure the concentration of chitin nanowhiskers in the gel is not too great, because as the concentration of chitin nanowhiskers in the gel rises, the likelihood of agglomeration of the chitin nanowhiskers rises accordingly. As an alternative to, or in combination with, centrifuging, evaporation may be employed for reducing the amount of water.

Preferably the method is conducted on a continuous basis, rather than a batch basis, such that chitin is continuously being input into the process and chitin nanowhisker gel is continuously being yielded by the process. Conducting the method on a continuous basis makes it more amenable to industrial scale production of chitin nanowhisker gel. For example, machines for continuous centrifuging may be employed.

Figure 2:
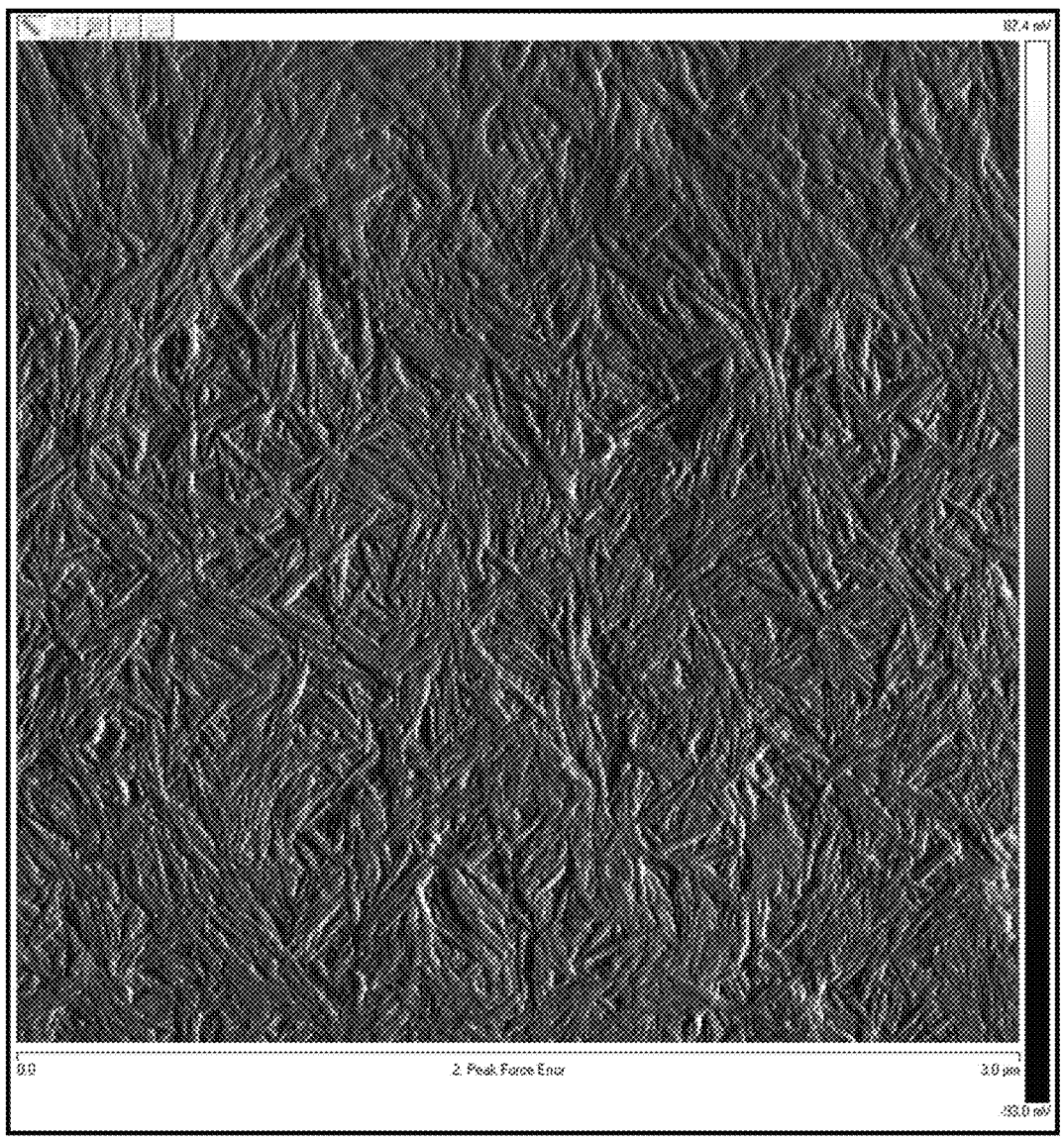
FIG. 2 is an image captured, using an atomic force microscope (AFM) using peak force error mode, of chitin nanowhiskers, wherein the scale bar is included within the image.
Figure 3:
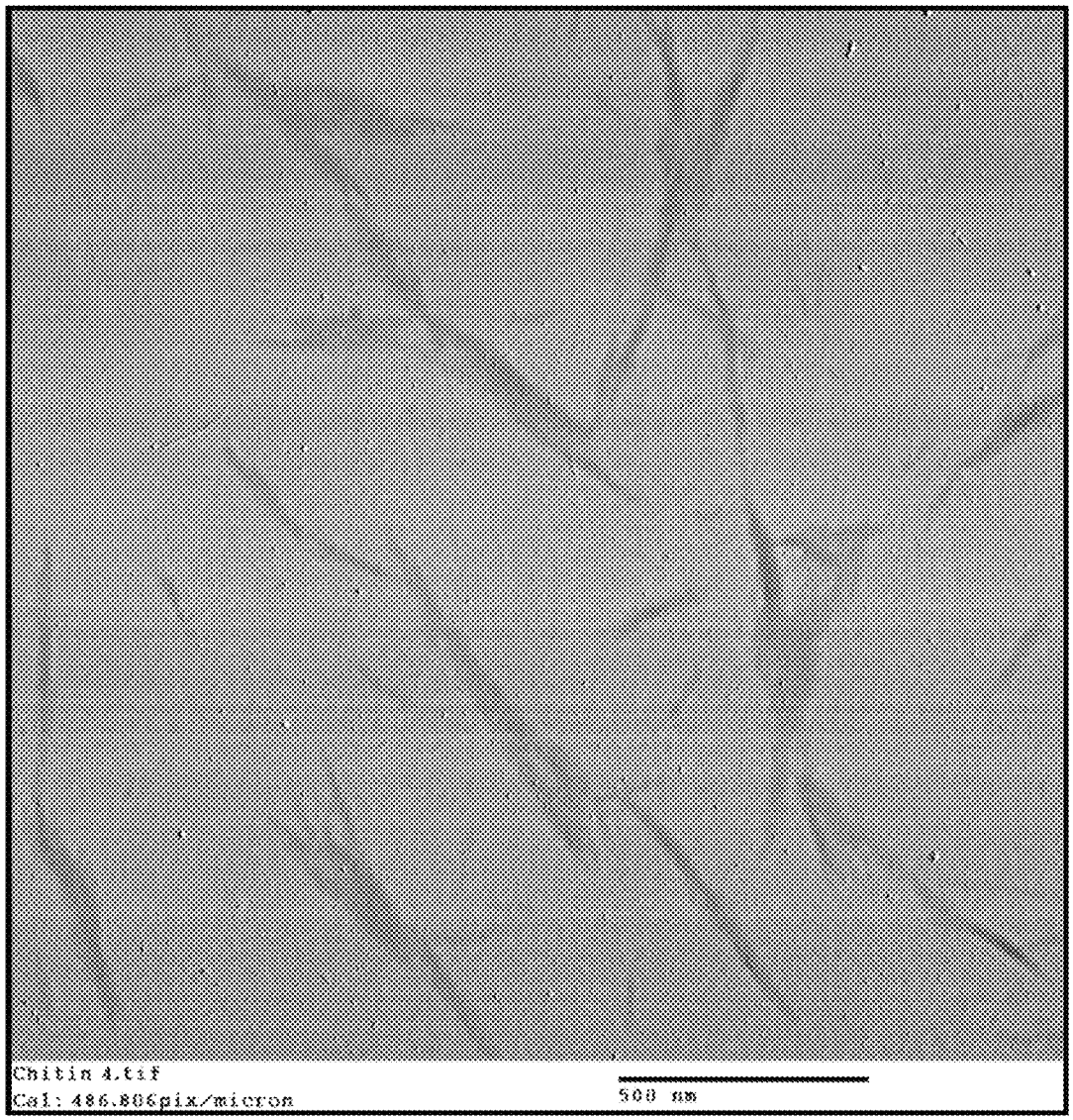
FIG. 3 is an image captured, using a transmission electron microscope (TEM), of chitin nanowhiskers.
Figure 4:
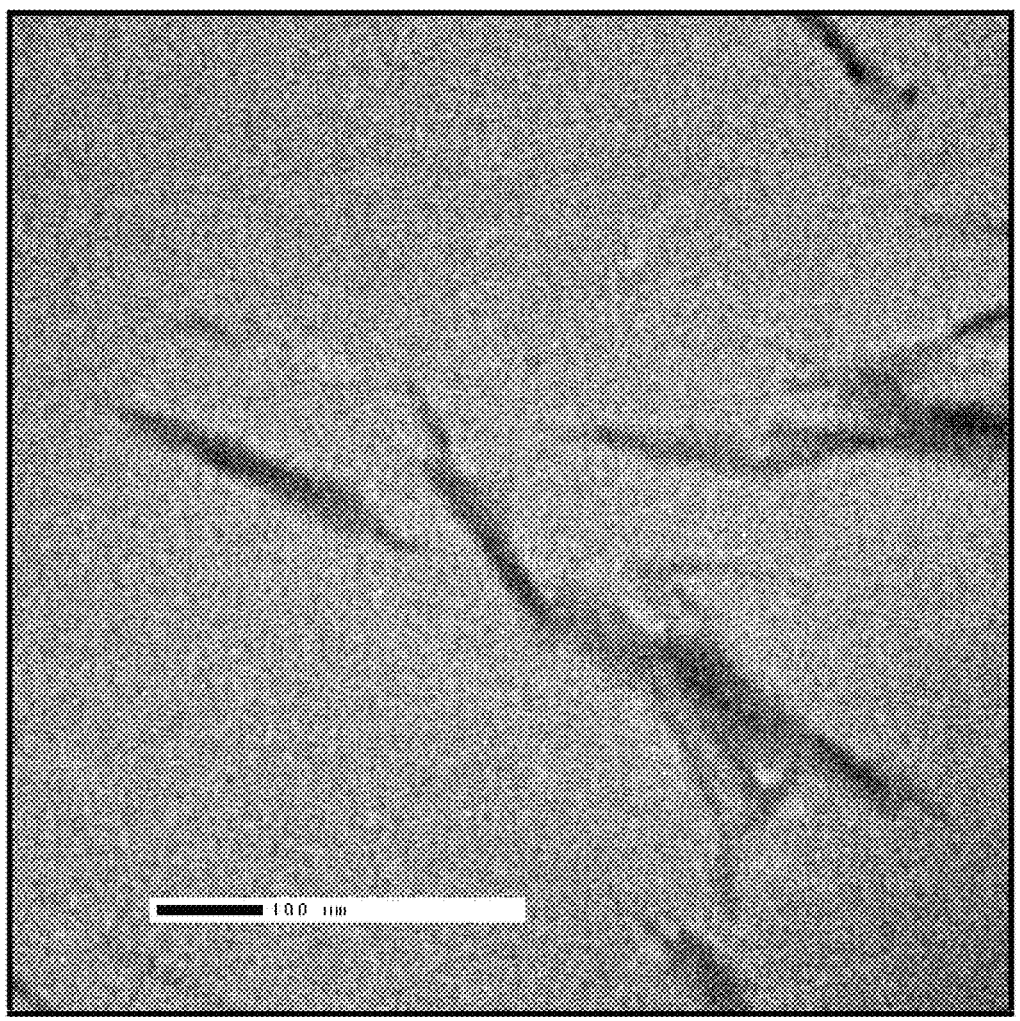
FIG. 4 is another image captured, using a TEM, of chitin nanowhiskers.
Figure 5:
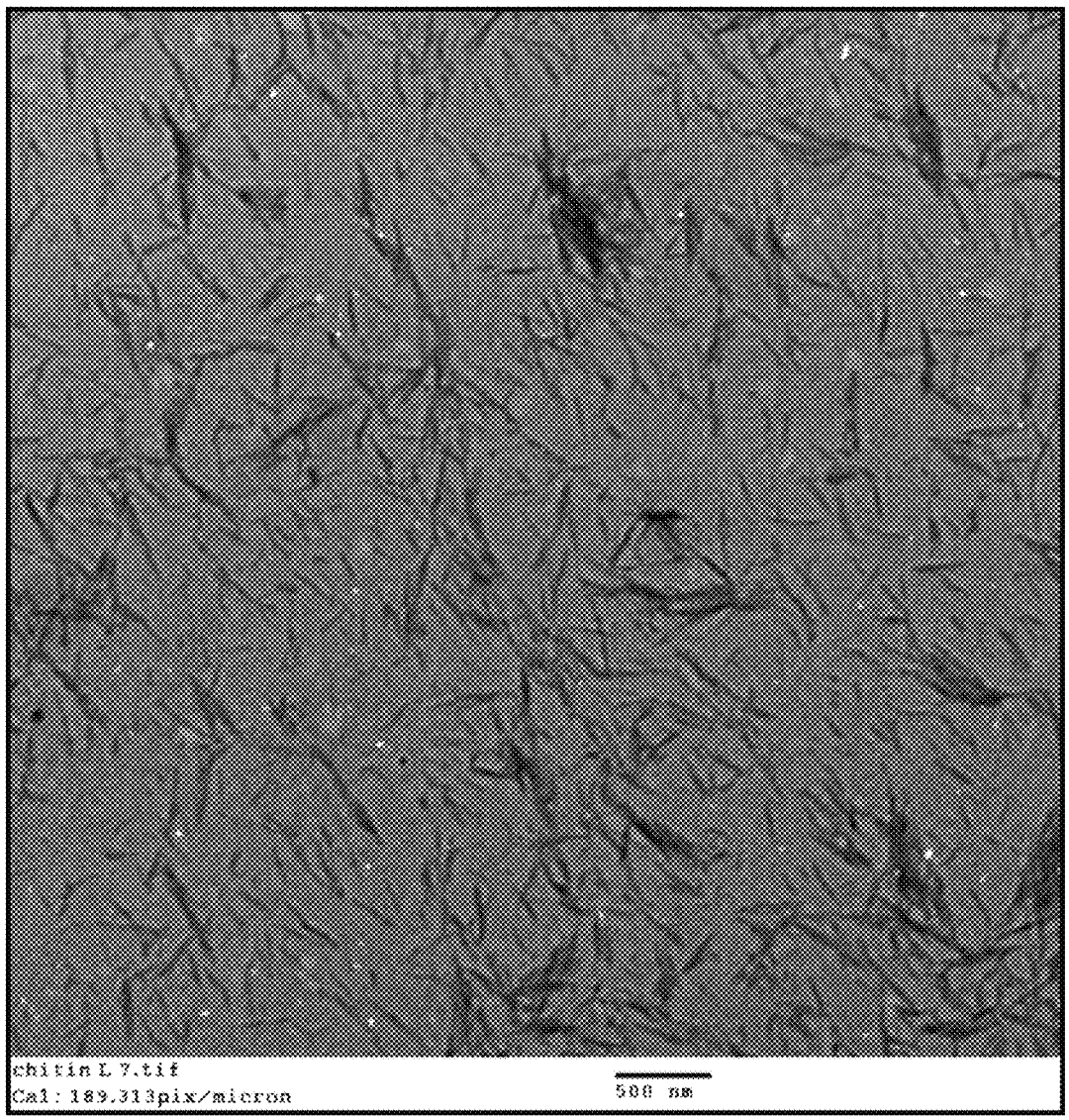
FIG. 5 is another image captured, using a TEM, of chitin nanowhiskers.

FIG. 2 is an image captured, using an atomic force microscope (AFM) using peak force error mode, of chitin nanowhiskers, wherein the scale bar is included within the image. FIGS. 3 through 5 are images captured, using a transmission electron microscope (TEM), of chitin nanowhiskers.

The chitin nanowhisker gel may be used for producing nanocomposites, or further processed to produce a chitin nanowhisker powder that itself may be used for producing nanocomposites. Preferably, such further processing to produce the chitin nanowhisker powder comprises lyophilising, or freeze-drying, the chitin nanowhisker gel. This is done in order to limit the extent to which the chitin nanowhiskers agglomerate with the loss of water, as compared with simply causing the water in the gel to evaporate. Without wishing to be bound to a particular theory, it is believed that evaporation permits individual chitin nanowhiskers to gradually organize into agglomerations, whereas the nature of freeze-drying limits such opportunities to produce fewer agglomerations.

Figure 6:
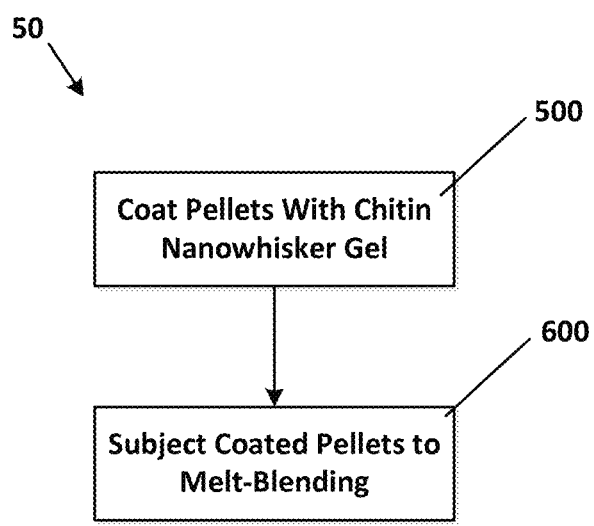
FIG. 6 is a flowchart showing steps in a method of forming a composite including chitin nanowhiskers dispersed in a thermoplastic polymer matrix.

The chitin nanowhisker gel may be employed in a downstream or separate process for producing nanocomposites having the chitin nanowhiskers dispersed in a bulk solid matrix such as a thermoplastic polymer. Turning to FIG. 6, a method 50 of forming a composite of chitin nanowhiskers dispersed in a thermoplastic polymer matrix is shown. During the method, thermoplastic polymer particles are coated with a chitin nanowhisker gel (step 500) and the coated particles are subjected to melt-blending thereby to term the composite (step 600).

Preferably the particles are pellets having a maximum diameter of about 1 centimetre (cm), and more preferably the majority of the pellets have a diameter of about 2 to about 3 millimetres (mm). The composite may be farther processed for form pellets of composite, or further processed to powder form.

Generally, coating is conducted to position nanowhiskers suspended in the gel with respect to the thermoplastic particles so as to facilitate dispersion of the nanowhiskers throughout the melted or softened thermoplastic polymer upon melt-blending. This technique makes it much more likely that a composite will be produced that has more uniform nanowhisker dispersion than those composites produced by methods that merely layer chitin nanowhisker gel atop a layer of the thermoplastic particles just prior to melt-blending. For example, with the prior layering methods, a great number of adjacent thermoplastic particles may not be in contact with, or even physically near to, the nanowhisker gel at the time of melt-blending, and a great volume of nanowhiskers gel may not be in contact with, or even, physically near, the thermoplastic particles. In such, cases, upon melt-blending sections of thermoplastic matrix can be formed that incorporate too few or too many chitin nanowhiskers, causing uniformity of the nanocomposite to suffer. In particular, sections of the nanocomposite can be formed that do not exhibit the beneficial properties that are desired of the nanocomposite as a whole, despite the correct overall relative amounts of matrix and nanowhiskers.

Furthermore, as the melt-blending, involves evaporation of the dispersion medium of the nanowhisker gel, insufficiently coating the particles with nanowhisker gel can result in agglomerations of chitin nanowhiskers rather than dispersion of individual chitin nanowhiskers in the thermoplastic polymer matrix.

Two primary factors determine the viability of the thermoplastic polymer being chosen for the matrix. The first is that, at least where the dispersion medium of the chitin nanowhisker suspension is water, the thermoplastic polymer should have a relatively low melting point at or below about 200 degrees C. The water is useful as a polar liquid medium that keeps the chitin nanowhiskers separated so they can be well-dispersed during melt-blending in the thermoplastic matrix. Accordingly, blending of the chitin nanowhiskers with the thermoplastic polymer during the melt-blending should begin prior to complete evaporation of the water. It will be understood that, where the dispersion medium is not water and has properties that cause it to evaporate differently than a water dispersion medium, a thermoplastic polymer with an accordingly higher melting point may be chosen. Furthermore, the temperature at which melt-blending is done can be regulated to account for various melting temperatures and rates of dispersion medium evaporation, or concentration of water can be established so as to delay full evaporation.

The second factor determining the viability of the thermoplastic polymer being chosen for the matrix, relates to water degrading certain thermoplastic polymers during the melt/blending process. For example, if water is the dispersion medium of the suspension, those thermoplastic polymers that are easily degraded by water may not viable. If such water-degradable thermoplastic polymers are to be used, it may be prudent to choose a dispersion medium other than water than, will not degrade the thermoplastic polymer. However, it should be borne in mind that, while water can trigger degradation of a given thermoplastic polymer, provided the reinforcement provided by the dispersed chitin nanowhiskers at least makes up for the degradation, the composition formed of that thermoplastic polymer is viable.

While it is preferred that each particle of thermoplastic polymer, whether pellet or powder, be individually coated simply for uniformity of mechanical properties across the entire body of the resultant nanocomposite, as a practical industrial matter not each and every particle must be completely coated in order for the overall body of the composite to benefit from the nanowhiskers.

Furthermore, melt-blending can be conducted under conditions that do not strictly "melt" the thermoplastic polymer, but sufficiently soften the thermoplastic polymer so that the chitin nanowhiskers can be dispersed.

The method of forming a composite described above may be employed to form a composite comprising particles of thermoplastic polymer coated with a chitin nanowhisker gel and melt-blended. The thermoplastic polymer may comprise polypropylene, polyethylene, acrylonitrile butadiene stymie, polycarbonate or other suitable thermoplastic polymer. The composite may comprise about 1% wt to about 5% wt chitin nanowhiskers.

EXAMPLES

Composites including chitin nanowhiskers dispersal in various thermoplastic polymers were fabricated. In each case, fabrication generally included coating thermoplastic particles with a chitin nanowhisker gel and subjecting the coated particles to melt-blending thereby forming the composite. In this embodiment, the majority of the particles were pellets with a diameter of about 2-3 millimetres.

In these examples, the dispersion medium of the chitin nanowhisker gel was water, and the chitin nanowhisker gel was produced according to the method described above.

Polypropylene (PP), Polyethylene (PE), Acrylonitrile butadiene styrene (ABS), Polycarbonate (PC) were experimentally determined to be viable for composites along with chitin nanowhisker. For example, viable composites include: a composite comprising chitin nanowhiskers dispersed in polypropylene, a composite comprising chitin nanowhiskers dispersed in polyethylene, a composite comprising chitin nanowhiskers dispersed in acrylonitrile butadiene styrene, and a composite comprising chitin nanowhiskers dispersed in polycarbonate. Various other thermoplastic polymers satisfying the above two conditions are likely to be viable candidates. In one embodiment, melt-blending was conducted 1.5-20 degrees above the melting temperature of the thermoplastic polymer to be used. At 20% chitin concentration, the gel was 5-10% wt of the thermoplastic polymer pellets.

Compositions comprising about 1 % wt chitin nanowhiskers compositions were fabricated as described above, and the fabricated compositions were subjected to tensile testing. In particular, tensile testing involved characterizing the tensile properties of the composites and foams on a tensile testing system (Instron Micro Tester 5848). The composition specimens were fabricated in accordance with ASTM D638 type 5 standard dogbone shape (7.62 mm gage length, 3 mm width, 1.5 mm thickness) and tensile tested with a strain rate of 0.5 mm/minute.

FIGS. 7 through 10 are graphs showing typical stress/strain curves, for respective ones of the above-described tests of PP, PE, ABS and PC alone and the respective 1% nanocomposite counterparts. All graphs represent test results as the average of four (4) samples. Typical stress/strain curves are presented.

Figure 7:
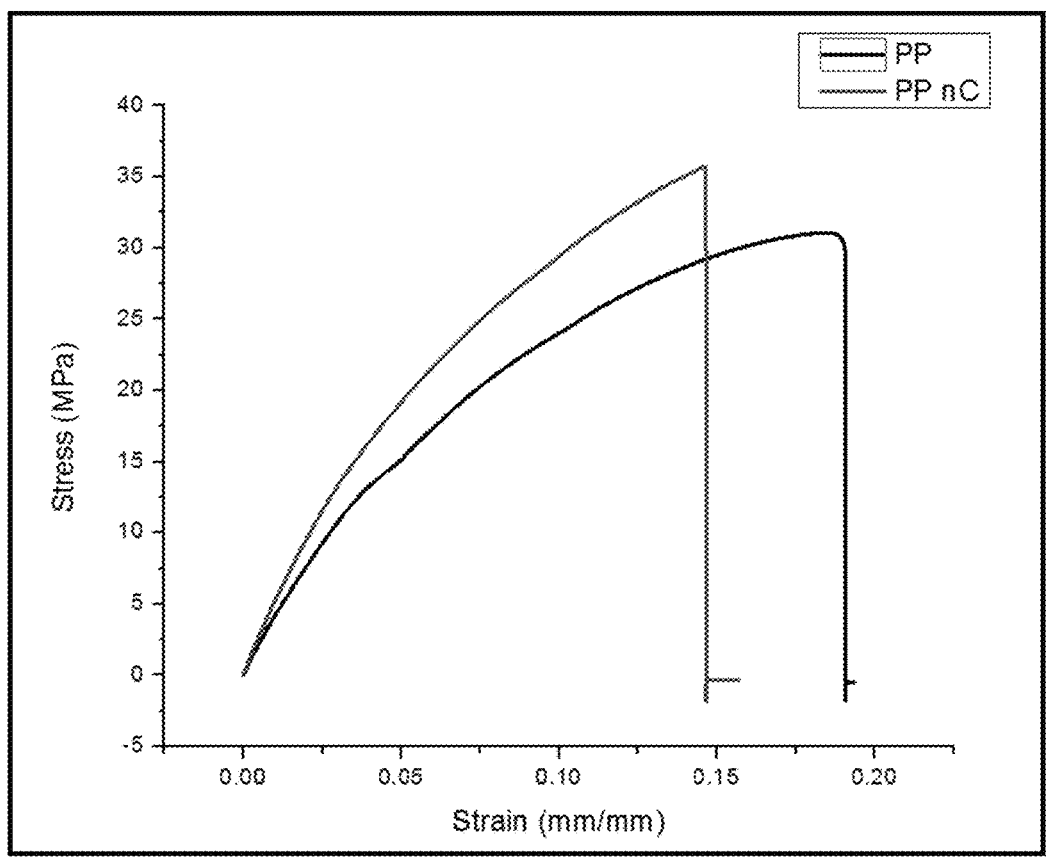
FIG. 7 is a graph showing a stress/strain curve for polypropylene (PP) and a counterpart PP-chitin nanowhisker composite (PP nC)

Table 1 below summarizes the comparisons of Ultimate Tensile Strength (UTS), Modulus, and Elongation between PP and the corresponding nanocomposite (PP nC) as depicted in the graph of FIG. 7:

TABLE 1

|  | PP | PP nC |
|---|---|---|
| UTS | 31.57 ± 0.61 | 34.17 ± 0.786 |
| Modulus | 363.29 ± 24.96 | 433.35 ± 34.23 |
| Elongation | 0.203 ± 0.015275 | 0.1707 ± 0.02269 |

Figure 8:
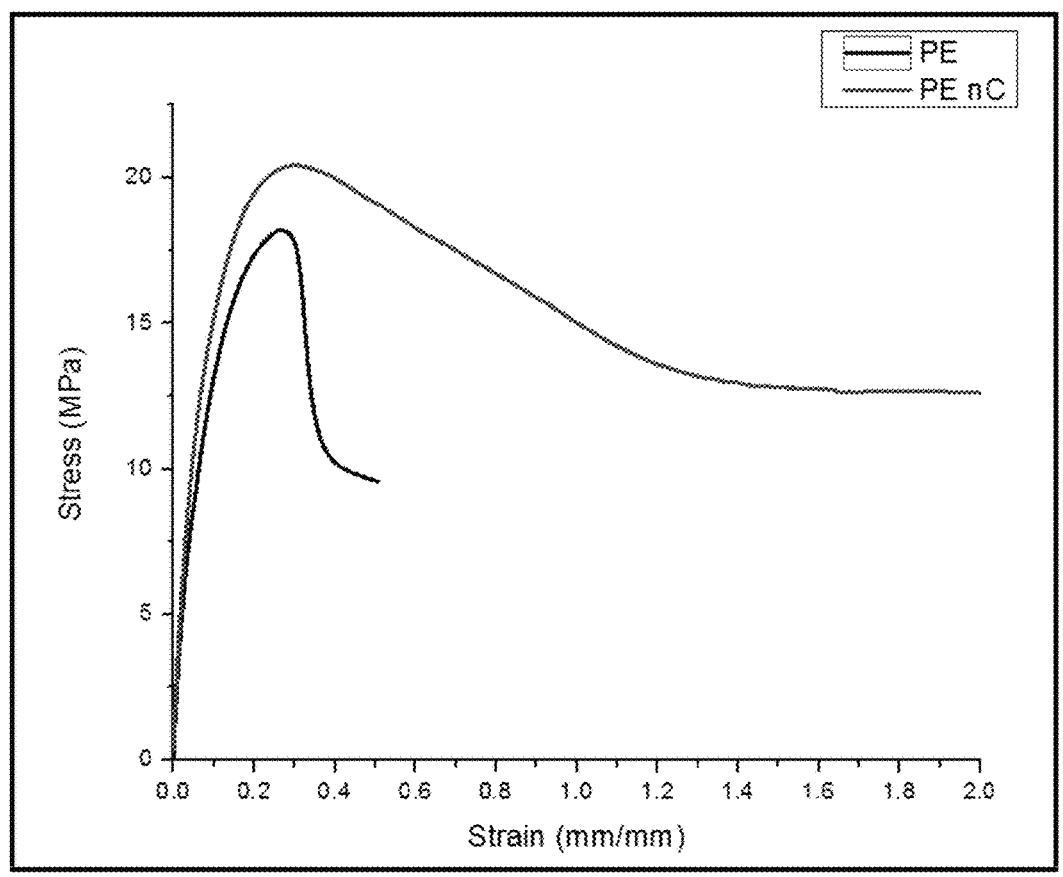
FIG. 8 is a graph showing a stress/strain curve for polyethylene (PE) and a counterpart PE-chitin nanowhisker composite (PE nC)

Table 2 below summarizes the comparisons of Ultimate Tensile Strength (UTS), Modulus, and Elongation between PE and the corresponding nanocomposite (PE nC) as depicted in the graph of FIG. 8:

TABLE 2

|  | PE | PE nC |
|---|---|---|
| UTS | 18.39 ± 0.955 | 20.31 ± 0.831 |
| Modulus | 248.17 ± 19.437 | 258.44 ± 16.474 |
| Elongation | 0.358 ± 0.054 | 3.03 ± 0.975 |

Figure 9:
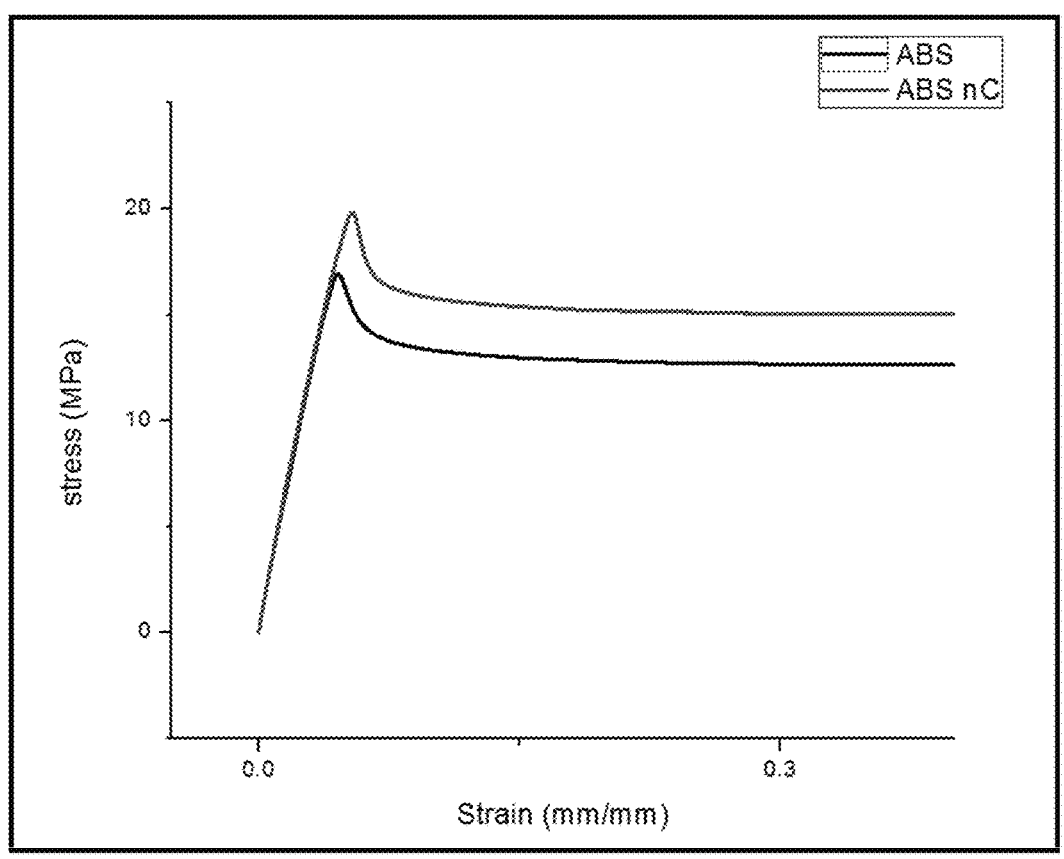
FIG. 9 is a graph showing a stress/strain curve for acrylonitrile butadiene styrene (ABS) and a counterpart ABS-chitin nanowhisker composite (ABS nC)

Table 3 below summarizes the comparisons of Ultimate Tensile Strength (UTS), Modulus, and Elongation between ABS and the corresponding nanocomposite (ABS nC) as depicted in the graph of FIG. 9:

TABLE 3

|  | ABS | ABS nC |
|---|---|---|
| UTS | 17.81 ± 0.938 | 19.42 ± 0.366 |
| Modulus | 428.09 ± 16.02 | 440.61 ± 4.57 |
| Elongation | 0.45 ± 0.255 | 0.585 ± 0.0517 |

Figure 10:
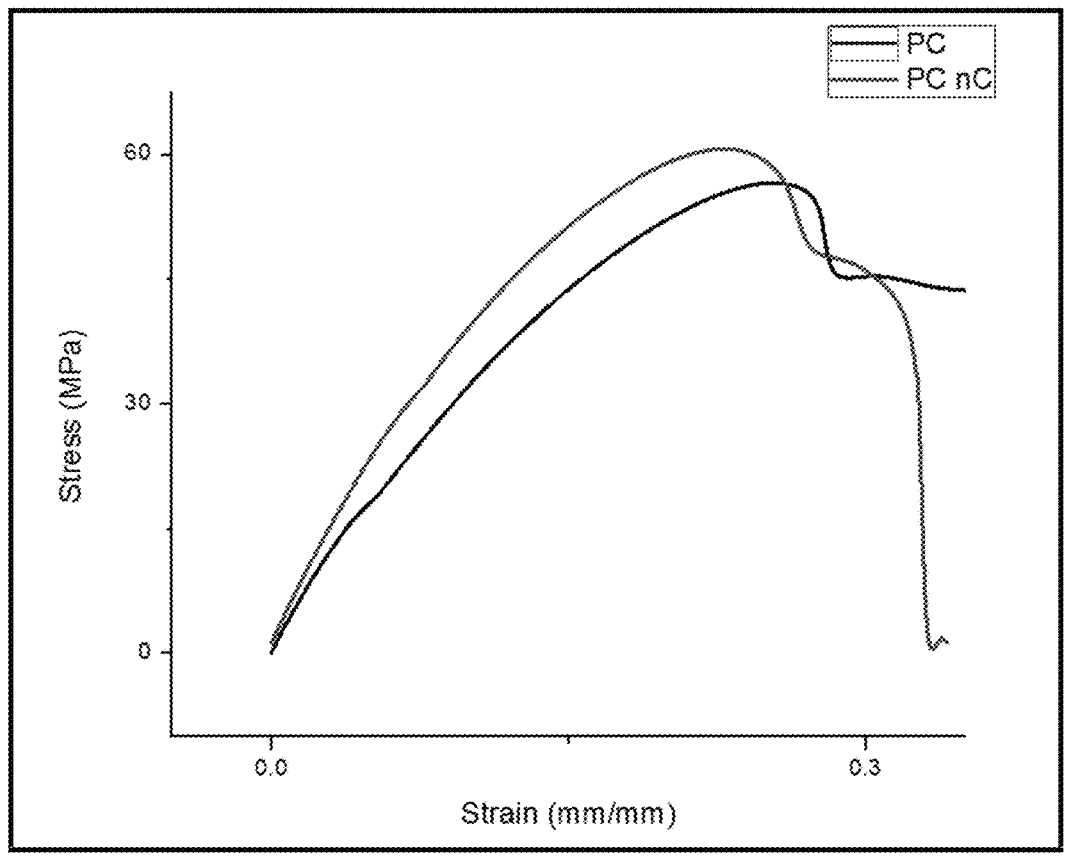
FIG. 10 is a graph showing a stress/strain curve for polycarbonate (PC) and a counterpart PC-chitin nanowhisker composite (PC nC).

Table 4 below summarizes the comparisons of Ultimate Tensile Strength (UTS), Modulus, and Elongation between PC and the corresponding nanocomposite (PC nC) as depicted in the graph of FIG. 10:

TABLE 4

|  | PC | PC nC |
|---|---|---|
| UTS | 57.06 ± 0.5416 | 59.12 ± 0.4588 |
| Modulus | 442.53 ± 14.79 | 494.85 ± 15.66 |
| Elongation | 0.4475 ± 0.166 | 0.3279 ± 0.0618 |

Although embodiments have been described with reference to the drawings, those of skill in the art will appreciate that variations and modifications may be made without departing from the spirit and scope thereof as defined by the appended claims.

What is claimed is:

1. A composite formed by melt-blending particles of thermoplastic polymer that have been coated with a chitin nanowhisker gel, wherein the thermoplastic polymer comprises acrylonitrile butadiene styrene copolymer.

2. The composite of claim 1, wherein the chitin nanowhisker gel is 5-10% wt of the thermoplastic polymer.

3. The composite of claim 1, wherein the chitin nanowhiskers are about 20% wt of the gel.

4. The composite of claim 1, wherein the composite comprises about 1% wt to about 5% wt chitin nanowhiskers.

5. The composite of claim 1, wherein the composite comprises about 1% wt chitin nanowhiskers.

6. A composite comprising chitin nanowhiskers dispersed in acrylonitrile butadiene styrene copolymer.

7. The composite of claim 6, wherein the composite comprises about 1% wt to about 5% wt chitin nanowhiskers.

8. The composite of claim 6, wherein the composite comprises about 1% wt chitin nanowhiskers.

* * * * *